(12) United States Patent
Miller (10) Patent No.: US 10,527,227 B1
(45) Date of Patent: Jan. 7, 2020

(54) PHOTOGRAPHIC PAYLOAD AUGMENTATION DEVICE AND METHOD OF USING SAME

(71) Applicant: STABILENS, LLC, Potsdam, NY (US)

(72) Inventor: Zachary Miller, Potsdam, NY (US)

(73) Assignee: STABILENS, LLC, Potsdam, NY (US)

( * ) Notice: Subject to any disclaimer, the term of this patent is extended or adjusted under 35 U.S.C. 154(b) by 0 days.

(21) Appl. No.: 16/579,171

(22) Filed: Sep. 23, 2019

Related U.S. Application Data (60) Provisional application No. 62/796,643, filed on Jan. 25, 2019.

(51) Int. Cl.
| | |
|---|---|
| *G03B 17/00* | (2006.01) |
| *F16M 13/04* | (2006.01) |
| *G03B 17/56* | (2006.01) |
| *F16M 11/08* | (2006.01) |
| *F16M 11/12* | (2006.01) |
| *F16M 11/10* | (2006.01) |

(52) U.S. Cl.
CPC ........... *F16M 13/04* (2013.01); *G03B 17/566* (2013.01); *G03B 17/568* (2013.01); *F16M 11/08* (2013.01); *F16M 11/10* (2013.01); *F16M 11/12* (2013.01)

(58) Field of Classification Search
USPC ........................................................ 396/428
See application file for complete search history.

(56) References Cited

U.S. PATENT DOCUMENTS

| | | | | |
|---|---|---|---|---|
| 6,257,219 B1* | 7/2001 | McPherson | ............... | F41B 5/10 |
| | | | | 124/25.6 |
| 2014/0147104 A1* | 5/2014 | Orf | ..................... | G03B 17/561 |
| | | | | 396/421 |
| 2017/0108761 A1* | 4/2017 | Pan | ........................ | F16M 11/02 |
| 2017/0123299 A1* | 5/2017 | Tonev | ...................... | G03B 3/00 |

OTHER PUBLICATIONS

Buy Quickdraw—reflexcinema, https://www.reflexcinema.com/products/quickdraw-single-unit, Sep. 6, 2019, 8 pages.
Quickdraw By Reflex Cinema—Lens Counterweight System for Gimbals—cinema5D, https://www.cinema5d.com/quickdraw-by-reflex-cinema-lens-counterweight-system-for-gimbals, Sep. 6, 2019, 9 pages.
Reflex Cinema—reflexcinema, https://www.reflexcinema.com/, Sep. 5, 2019, 6 pages.

* cited by examiner

*Primary Examiner* — Rodney E Fuller
(74) *Attorney, Agent, or Firm* — Woods Oviatt Gilman LLP; Dennis B. Danella, Esq.

(57) ABSTRACT

A photographic payload augmentation device includes a ring defining a ring body for mounting onto a photographic payload device and a plurality of weight plugs. The ring body has a plurality of recesses so that a respective weight may be selectively inserted within a respective recess. The ring body may be cylindrically shaped and may also include an inner sidewall, an outer sidewall, a top face and a bottom face. Each recess is defined by a recess sidewall and terminates at a bottom wall located intermediate the top face and the bottom face. The ring body may still further define a plurality of apertures wherein a respective aperture is located between respective recess sidewalls of adjacent recesses of the plurality of recesses. The bottom wall may also define a plurality of slots wherein a respective slot communicates with a respective recess of the plurality of recesses.

15 Claims, 6 Drawing Sheets

PHOTOGRAPHIC PAYLOAD AUGMENTATION DEVICE AND METHOD OF USING SAME

CROSS-REFERENCE TO RELATED APPLICATIONS

This application claims the benefit of U.S. Provisional Patent Application No. 62/796,643, filed Jan. 25, 2019, entitled PHOTOGRAPHIC PAYLOAD AUGMENTATION DEVICE, the entirety of which is incorporated herein by reference.

FIELD OF THE INVENTION

The present invention relates to photography equipment; in particular, a photographic payload augmentation device; and more particularly to a photographic payload augmentation device adapted to be mounted onto a camera lens so as to maintain gimbal balance following lens changes, as well as a method of using the device.

BACKGROUND OF THE INVENTION

Stabilized support systems for photographic payloads, such as a gimbal stabilizer for a camera, need to be balanced before use. There are dozens of styles of gimbals, from 3-axis electronic gimbals, to older-style STEADICAM vests (The Tiffen Company LLC, Hauppauge, N.Y.), to a GLIDECAM system (Glidecam Industries, Inc., Kingston, Mass.). Importantly, all of these support systems/stabilizers need precision balance to work properly. However, if the weight on the gimbal is changed, such as by changing a lens or another element, the gimbal must then be rebalanced. Video camera operators do not always have the time to rebalance the gimbal during a fast-paced shoot. As a result, these operators may compromise their creativity by using only one lens so as to forego the time and effort needed to rebalance the gimbal.

Counterbalance products are available, but they are for very niche problems and generally add time and complicate the balancing process. For instance, sometimes a lens is so big and heavy that the camera cannot be physically shifted back far enough to balance the gimbal. In this case, there are counterweights that can be added to the back of the camera to counterbalance the heavy lens. There are also counterbalance products for smart phone gimbals. However, most smart phone gimbals cannot handle a heavier than average load, so a counterbalance is needed in order to keep the gimbal balanced when the phone is in its case or when a smart phone lens accessory is added to the smart phone.

Therefore, there is a need for a system and method that allows for pre-balancing different loads and different lenses so as to avoid rebalancing of the gimbal following swapping of the loads/lens. The present invention addresses these as well as other needs.

BRIEF SUMMARY OF THE INVENTION

In accordance with one aspect of the present invention a photographic payload augmentation device is used to quickly and easily add counterweight to photographic lenses for the purpose of balancing a camera system on any stabilized camera support system, including but not limited to a three-axis gimbal, a two-axis gimbal, a STEAD ICAM, a GLIDECAM or an unmanned autonomous vehicle (i.e., a UAV or drone). The photographic payload augmentation device may thus make it possible for photographers and videographers to swap photographic lenses on a stabilized camera support system without the need for rebalancing the entire system, thereby saving time and effort.

In one aspect of the invention, an embodiment of a photographic payload augmentation device is made from a flexible material, such as but not limited to natural rubber or a synthetic rubber like silicone. The flexible material also stretches to fit around a number of photographic lens sizes (or any other object that requires precision balancing). The photographic payload augmentation device features a number of spaces/recesses around its circumference within which small weights may be selectively placed in order to achieve precision balance. The weights may be held in place through friction and/or the aid of a lip on the device. The device holds each weight in place securely so that the entire device may be removed and reapplied quickly and easily. An indicator may be located on the device to assist proper alignment and orientation of the device when being installed on the lens. The device's size, number of recesses for weights, materials used, and the size and material of the weights themselves may vary depending on the balancing application. As a result, the photographic payload augmentation device enables a user to modify a plurality of photographic lenses so as to equilibrate their center of gravity, whereby any lens may be mounted onto the camera while the gimbal remains balanced.

In a further aspect of the present invention, weights may also be placed around the outside of the photographic payload augmentation device using a number of methods, such as but not limited to clips, magnetism, or using the existing recesses for weights. The outer surface of the ring may be textured for grip, but may also be smooth or geared for use with other photographic accessories, including but not limited to a follow focus. In additional embodiments, the outside of the device may allow for writing using a dry erase marker. The device may also have cut-outs to allow the user to access lens controls that may be otherwise inaccessible due to placement of the photographic payload augmentation device on the lens.

In accordance with yet another aspect of the present invention, when using an embodiment of the photographic payload augmentation device, the user places a first camera system and lens on a stabilized camera support system. The user then positions the photographic payload augmentation device around the barrel of a lens or lens hood of a second photographic lens. The second photographic lens with photographic payload augmentation device is then mounted onto the stabilized camera support system with weights being selectively added to the photographic payload augmentation device until the camera support system is rebalanced. The user may then repeat this process with any number of lenses, with each lens having its own dedicated photographic payload augmentation device. When finished, the user may then swap lenses easily without the need for rebalancing of the camera support system.

It is, therefore, an aspect of the present invention to provide a photographic payload augmentation device comprising a ring defining a ring body configured to mount onto a photographic payload device. The ring body defines a plurality of recesses therein. Also included is a plurality of weight plugs wherein at least one respective weight plug of the plurality of weight plugs is selectively removably insertable within at least one respective recess of the plurality of recesses. The ring body may include an inner sidewall, an outer sidewall, a top face and a bottom face, and may be cylindrically shaped. Each recess of the plurality of recesses is defined by a recess sidewall and terminates at a bottom wall located intermediate the top face and the bottom face. The ring body may still further define a plurality of apertures wherein a respective aperture is located between respective recess sidewalls of adjacent recesses of the plurality of recesses. The bottom wall may also define a plurality of slots wherein a respective slot communicates with a respective recess of the plurality of recesses.

In a further aspect of the present invention, the at least one respective weight plug is secured within the at least one respective recess via a friction fit. The at least one respective weight plug may also sit flush with or slightly below the top face of the ring body when inserted within the at least one respective recess. Each weight plug may comprise any suitable natural and/or synthetic material. By way of example and without limitation thereto, weight plugs may comprise a metal, such as lead, steel, aluminum or tungsten and their alloys; a polymeric material, such as a thermoplastic including without limitation, high density polyethylene (HDPE) and/or polyether block amide (PEBA); and composites comprising any combination of the above. The ring body may be fabricated from natural rubber or a synthetic elastomer such as, for example, one or more of silicone, polybutadiene, polychloropene, polyisobutylene and poly(styrene-butadiene-styrene) rubber.

In still another aspect of the present invention, the photographic payload augmentation device may further include an external weight adaptor. The external weight adaptor may comprise a plug portion dimensioned to be received within a selected recess. A flange may have a first end releasably coupled to the plug portion and a second end fixedly coupled to a weight mount. One or more weight units may be releasably mounted on the weight mount.

In another aspect, the present invention may provide for a method for enabling swapping of lenses on a photographic payload device mounted on a stabilized support system. The method may comprise: a) mounting a photographic payload device having a first lens on the stabilized support system; b) adjusting the stabilized support system to balance the photographic payload device and first lens; c) locking the stabilized support system balance; d) removing the first lens from the photographic payload device; e) mounting a photographic payload augmentation device onto a second lens, wherein the photographic payload augmentation device comprises a ring defining a ring body having a plurality of recesses therein; f) mounting the second lens with photographic payload augmentation device onto the photographic payload device; and g) selectively inserting at least one respective weight plug of a plurality of weight plugs within at least one respective recess of the plurality of recesses of the photographic payload augmentation device until the photographic payload device and second lens are rebalanced on the stabilized support system.

In a further aspect of the present invention, the method may further comprise repeating steps d) through g) for each additional lens mounted onto the photographic payload device. Additionally, step e) may be completed any time prior to step g).

Additional aspects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
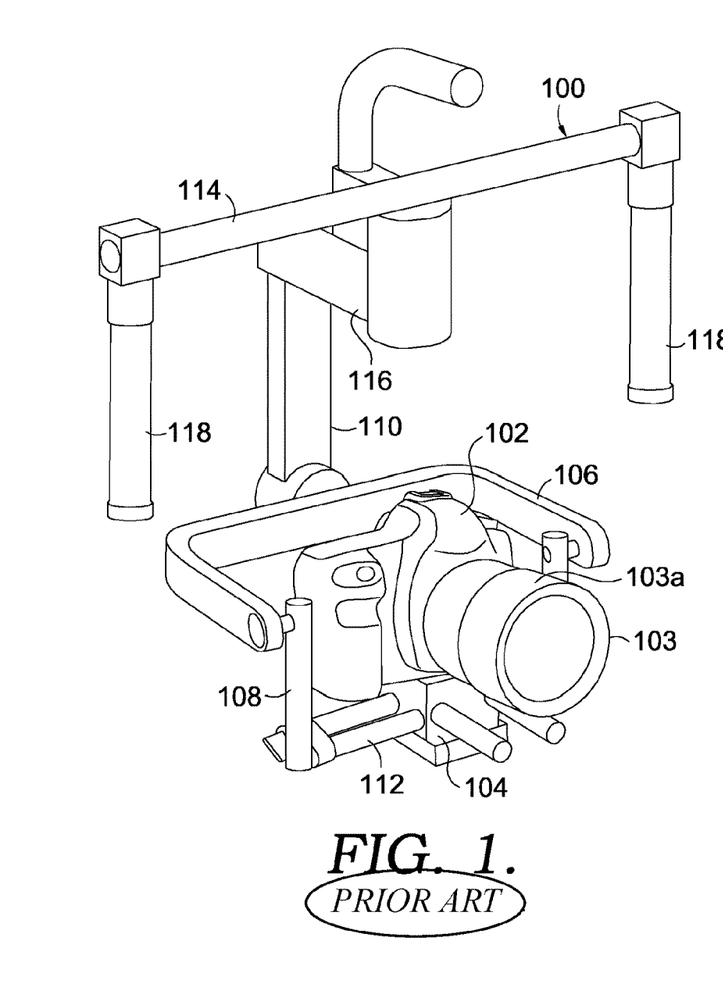
FIG. 1 is an exemplary stabilized support system with a mounted photographic payload.

With reference to FIG. 1, there is shown an exemplary stabilized support system 100 with mounted photographic payload 102. By way of example and without limitation thereto, stabilized support system 100 may be a three-axis gimbal, a two-axis gimbal, a STEADICAM, a GLIDECAM, an unmanned autonomous vehicle, or other suitable device. Furthermore, photographic payload 102 may be, for example and without limitation thereto, a cinema/movie camera, a video camera, a digital single lens reflex (DSLR) camera, a single lens reflex camera (SLR), a mirrorless camera or a point-and-shoot camera. For the sake of clarity, in the following discussion stabilized support system 100 may be referred to as gimbal 100 while photographic payload 102 will be referred to as camera 102. In accordance with an aspect of the present invention, camera 102 is a DSLR camera which allows for switching of lenses 103, as will be described in greater detail below.

Returning to FIG. 1, exemplary gimbal 100 is a three-axis gimbal allowing for pan, tilt and roll control. To that end, gimbal 100 includes a camera mount 104 upon which is secured camera 102. Camera mount 104 is pivotally mounted within tilt control arm 106 which enables rotation about the x-axis (i.e., tilt), such as via tilt adjuster 108. Tilt control arm 106 is pivotally coupled to gimbal frame 110, such as via a roll adjuster 112, so as to enable rotation about the z-axis (i.e., roll). A handle bar 114 may be pivotally coupled to the opposing end of gimbal frame 110, such as via pan adjuster 116, so as to enable rotation about the y-axis (i.e., pan). Handle bar 114 may include handles 118 at each end for grasping during use. Before camera 102 mounted on gimbal 100 can be used, gimbal 100 must be balanced so that camera 102 does not tilt forwards/backwards or leftwards/rightwards within gimbal 100. To balance gimbal 100, the location of camera 102 is adjusted via pan adjuster 116, tilt adjuster 108, and roll adjuster 112 until the camera remains steady within the gimbal when the gimbal is moved.

It should be noted that while gimbal 100 is shown as a two-handled, three-axis unit, there are a number of alternative gimbals available in the marketplace. As will be discussed in greater detail below, photographic payload augmentation device 130 of the present invention, shown in FIGS. 2-5, may be used with any gimbal unit to equal effect.

Figure 2:
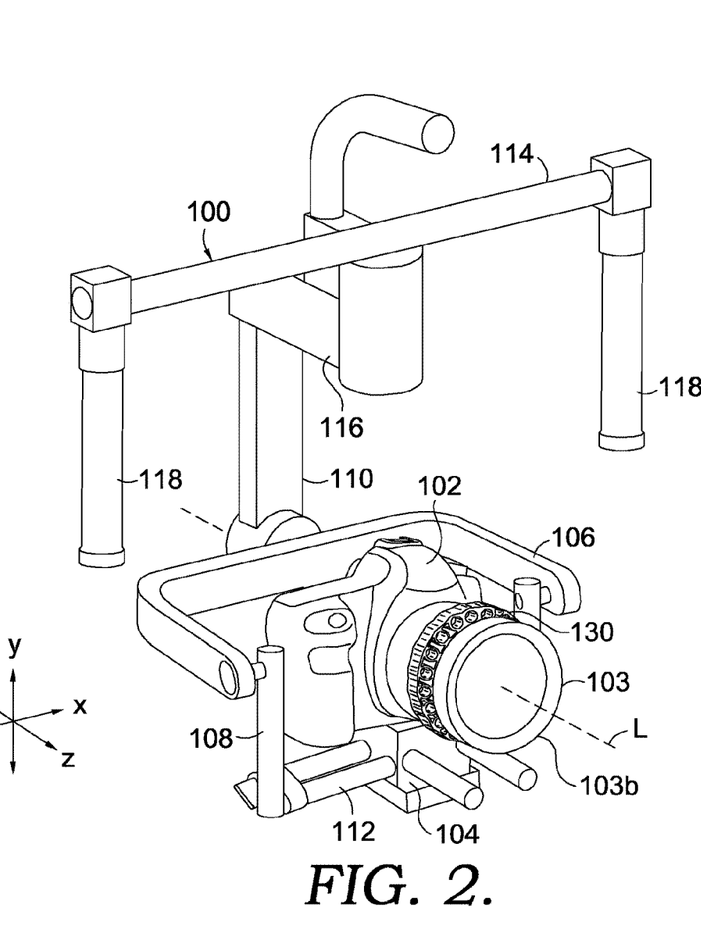
FIG. 2 is the exemplary stabilized support system shown in FIG. 1 with a second mounted photographic payload equipped with a photographic payload augmentation device in accordance with an aspect of the present invention.

Turning now to FIGS. 2-5, an embodiment of photographic payload augmentation device 130 in accordance with the present invention generally comprises a ring 132 having a ring body 134 configured to mount onto photographic payload device (camera) 102 (see FIG. 2). For the sake of clarity, photographic payload augmentation device 130 will be referred to herein as a cylindrically shaped ring, although it should be noted that other shapes may be used depending upon the shape of the intended substrate (photographic payload device), such as for example, a generally rectangular smart phone, and that such additional shapes/structures are to be considered within the teachings of the present disclosure. In accordance with an aspect of the present invention, ring body 134 is adapted to stretch and retract so as to accommodate lenses of varying diameters. Ring body 134 may be fabricated from an elastomeric material, such as but not limited to natural rubber or a synthetic elastomer. Exemplary, non-limiting synthetic elastomers include one or more of silicone, polybutadiene, polychloropene, polyisobutylene and poly(styrene-butadiene-styrene) rubber.

Figure 3:
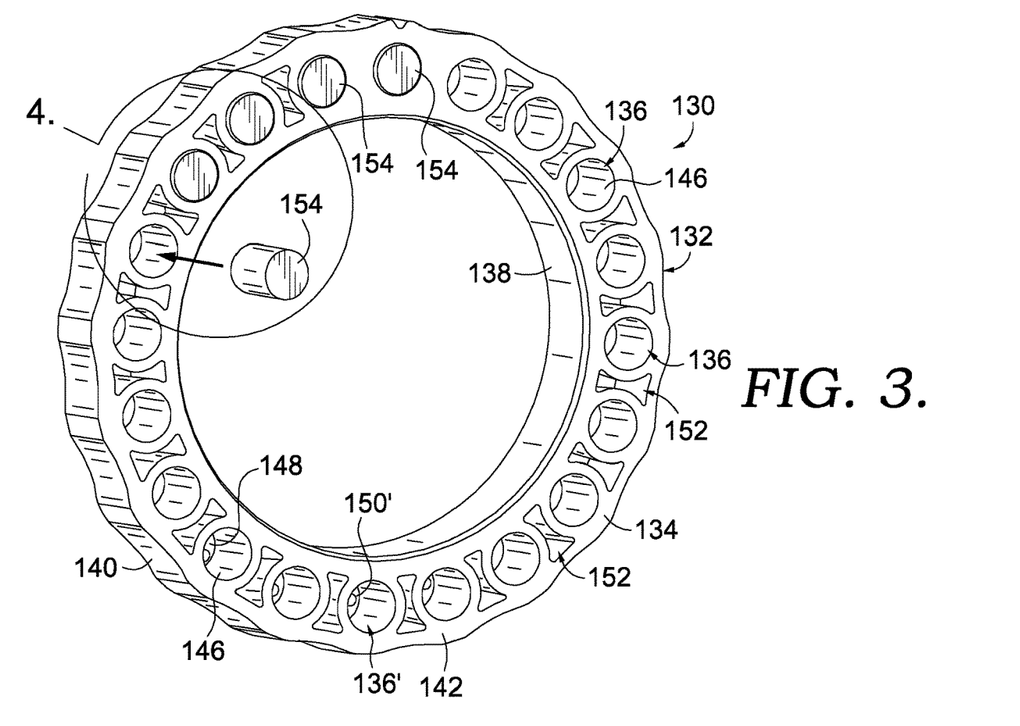
FIG. 3 is a front perspective view of a photographic payload augmentation device in accordance with an aspect of the present invention.
Figure 4:
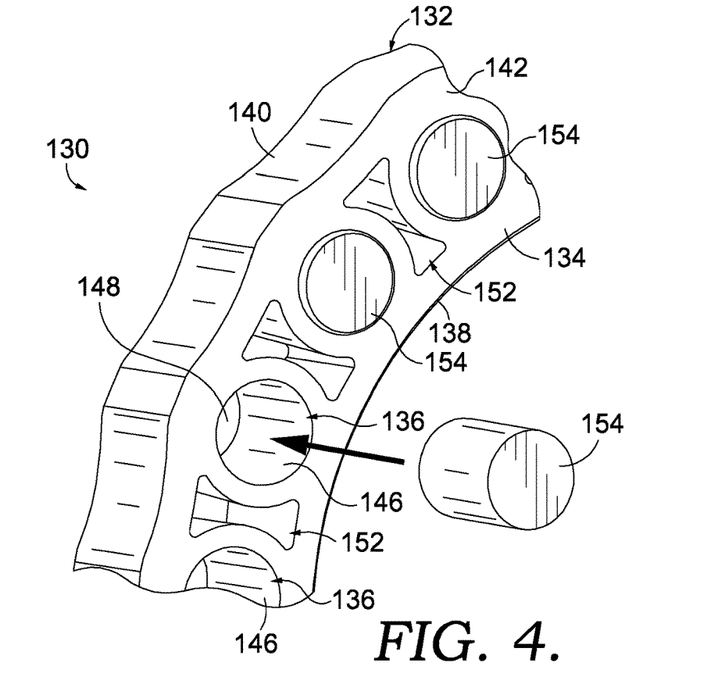
FIG. 4 is an expanded view of a portion of the photographic payload augmentation device shown in FIG. 3.
Figure 5:
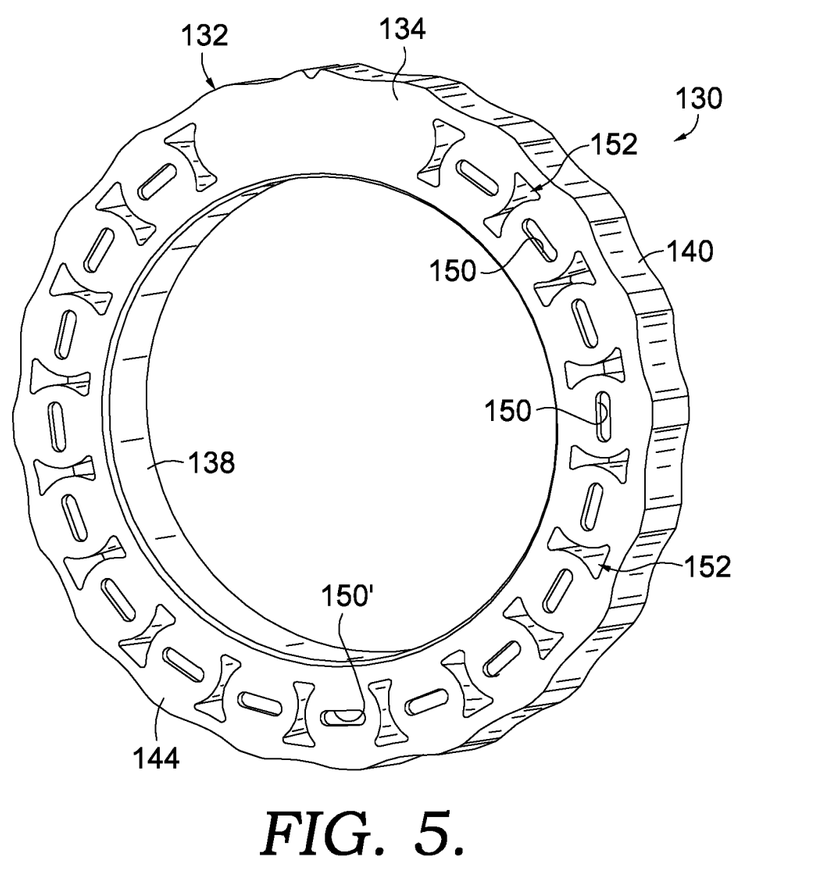
FIG. 5 is a rear perspective view of the photographic payload augmentation device shown in FIG. 3.

With reference to FIG. 3, ring body 134 defines a plurality of recesses 136 therein. Accordingly, ring body 134 may include an inner sidewall 138, outer sidewall 140, a top face 142 and a bottom face 144. In accordance with an aspect of the present invention, successive recesses 136 are arranged generally equidistant one another along top face 142 around the circumference of ring body 134. While each recess 136 may comprise a through-bore extending throughout ring body 134 from top face 142 to bottom face 144, in one aspect of the present invention, each recess 136 of the plurality of recesses may be defined by a recess sidewall 146 which terminates at a bottom wall 148 located intermediate top face 142 and bottom face 144 of ring body 134. In a further aspect of the present invention, bottom wall 148 may define a plurality of slots 150 wherein a respective slot 150' communicates with a respective recess 136' (see FIG. 5). To assist flexing and stretching of ring 130, ring body 134 may include a plurality of apertures 152 extending therethrough from top face 142 to bottom face 144. Each respective aperture 152 may be located between respective recess sidewalls 146 of adjacent recesses 136.

In accordance with an aspect of the present invention, each recess 136 is configured to selectively receive a respective weight plug 154 therein. As will be discussed in greater detail below, each respective weight plug 154 is selectively removably insertable within a respective recess 136' of the plurality of recesses 136, as indicated by arrow A in FIGS. 3 and 4. In one aspect, each weight plug 154 may be secured within its respective recess 136 via a friction fit, although other mounting means may be used, such as but not limited to magnetism, threaded coupling or an adhesive. Slots 150, located within bottom wall 148, may ease removal of weight plug 154 from a recess 136 by receiving a tool therein, such as a finger nail or small screwdriver, so as to push the weight plug 154 out of the recess 136. In a further aspect of the present invention, each weight plug 154 is dimensioned so as to sit flush with or slightly below top face 142 of ring body 134 when fully inserted within its respective recess 136. To minimize the size of ring 130 while also providing sufficient weight, weight plugs 154 may be fabricated from a dense material such as, but not limited to, any suitable natural and/or synthetic material. By way of example and without limitation thereto, weight plugs may comprise a metal, such as lead, steel, aluminum or tungsten and their alloys; a polymeric material, such as a thermoplastic including without limitation, high density polyethylene (HDPE) and/or polyether block amide (PEBA); and composites comprising any combination of the above.

Figure 6:
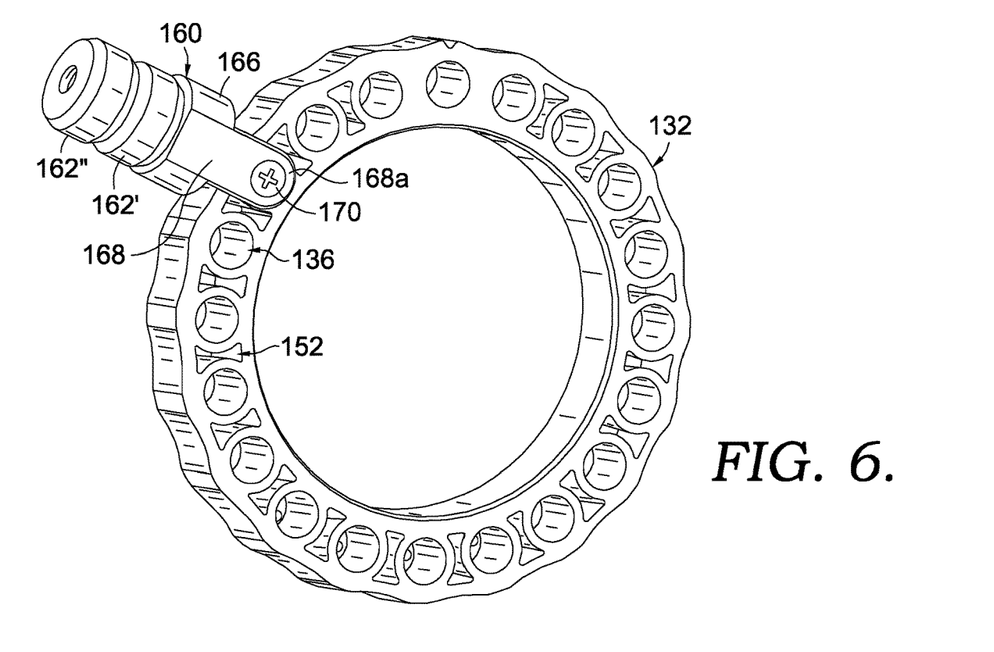
FIG. 6 is a front perspective view of the photographic payload augmentation device shown in FIG. 3 with an external weight adapter in accordance with an aspect of the present invention.
Figure 7:
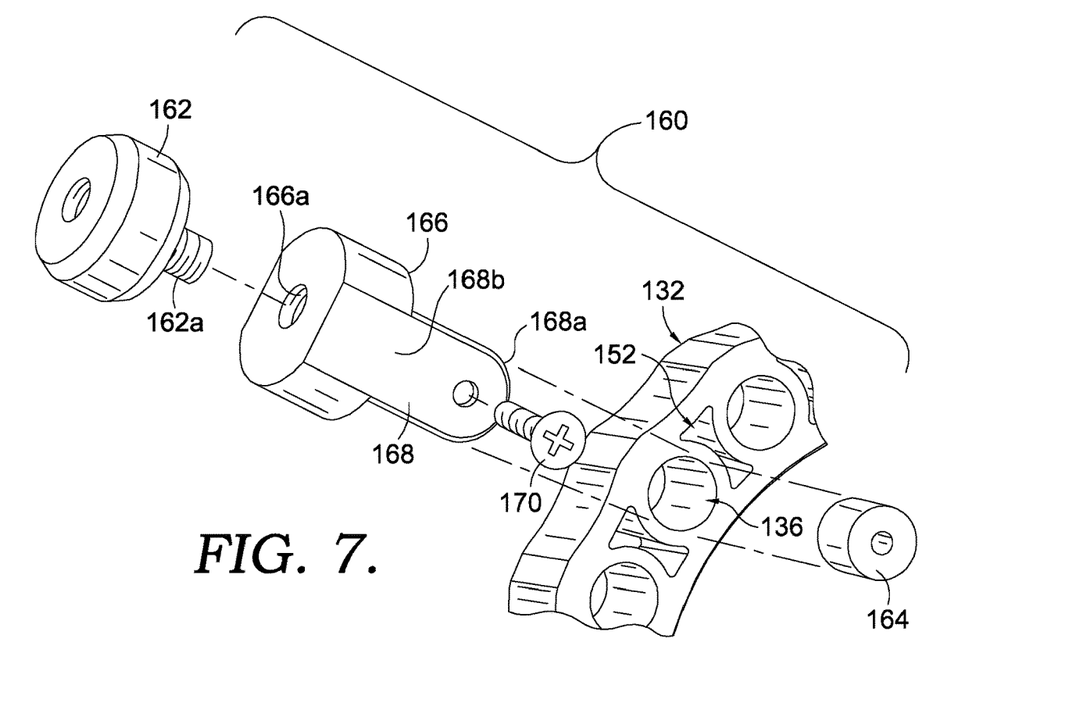
FIG. 7 is an expanded exploded view of the photographic payload augmentation device with external weight adapter shown in FIG. 6.

Turning now to FIGS. 6 and 7, ring 130 may be further adapted to include an external weight adaptor 160 for use with lenses that are especially heavy or awkward and that cannot be balanced using only weight plugs 154 added to ring body 134. To balance such lenses, as discussed in greater detail below, external weight adaptor 160 is configured to add weight units 162 exterior of ring body 134. In accordance with an aspect of the present invention, external weight adaptor 160 may include a plug portion 164 which is dimensioned to be received within a selected recess 136 within ring body 134. Weight mount 166 may then be coupled to plug portion 164, such as via a flange 168.

As shown most clearly in FIG. 7, flange 168 has a first end 168a and a second end 168b. First end 168a is releasably coupled to plug portion 164, such as via a fastener 170. Fastener 170 may be any suitable device, including but not limited to a screw, bolt, pin, and the like. Second end 168b is fixedly coupled to weight mount 166. One or more weight units 162 may be releasably mounted to weight mount 166. By way of example, weight mount 166 may include a threaded portion 166a adapted to threadably couple with corresponding threaded element 162a on weight unit 162. As shown, threaded portion 166a may include female threads while threaded element 162a may be a post with male threads. However, it should be noted that the assignment of the male/female couplings may be reversed. Additional weight units 162 may be added through mating coupling of female threads 162b defined on a first weight unit 162' with male threads (not shown) on a second weight unit 162" (see FIG. 6). Again, the assignment of the male/female coupling threads may be reversed.

Figure 8:
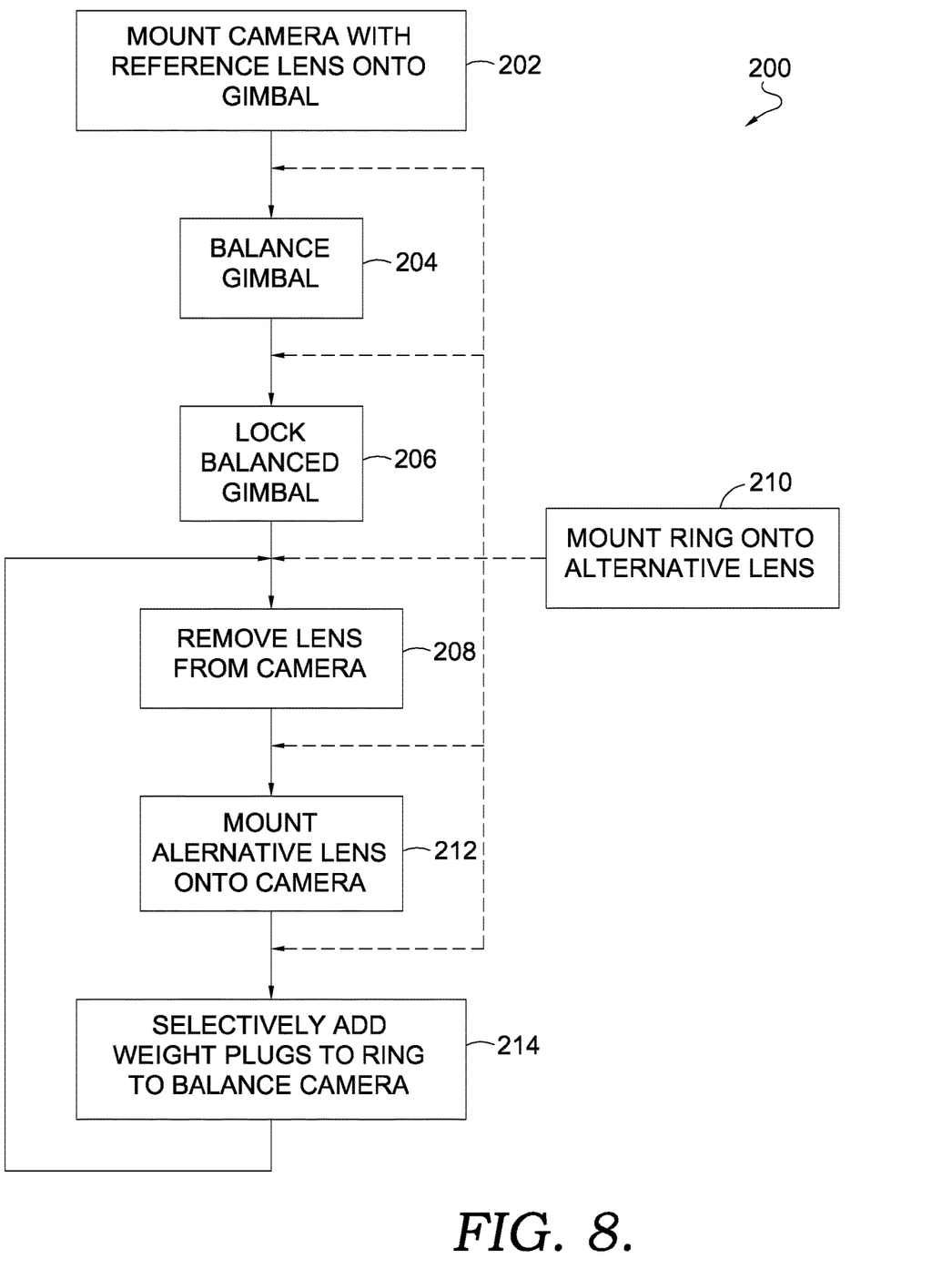
FIG. 8 is a flow chart of an exemplary method for swapping photographic payloads using the photographic payload augmentation device in accordance with an aspect of the present invention.
Figure 9:
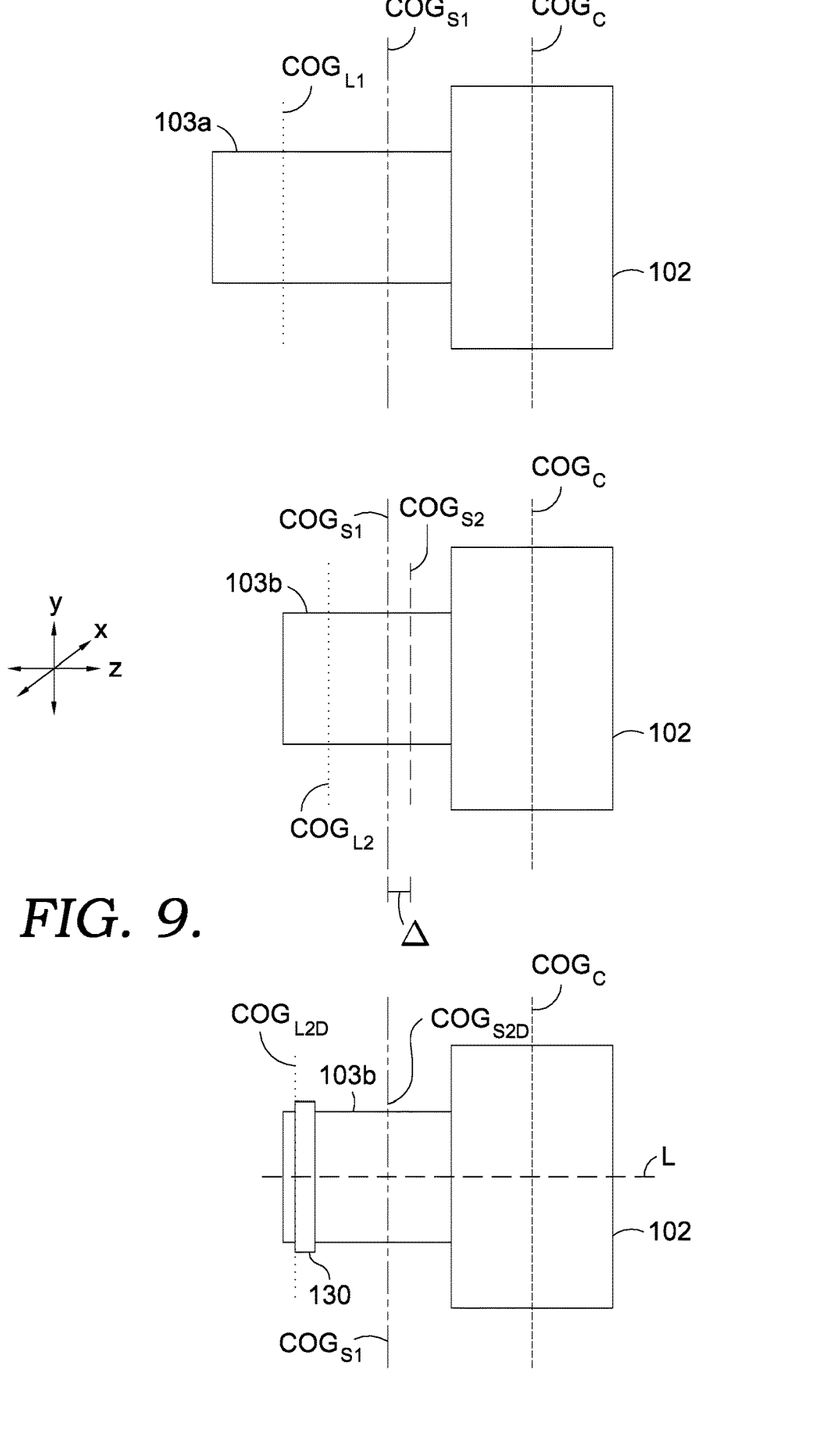
FIG. 9 is a schematic of an exemplary lens swap using the exemplary method shown in FIG. 8.

With reference to FIGS. 8 and 9, a method for enabling swapping of lenses on a photographic payload device mounted on a stabilized support system is generally indicated by reference numeral 200. Briefly, method 200 may comprise: a) mounting a photographic payload device having a first lens on the stabilized support system (step 202); b) adjusting the stabilized support system to balance the photographic payload device and first lens (step 204); c) locking the stabilized support system balance (step 206); d) removing the first lens from the photographic payload device (step 208); e) mounting a photographic payload augmentation device onto a second lens, wherein the photographic payload augmentation device comprises a ring defining a ring body having a plurality of recesses therein (step 210); f) mounting the second lens with photographic payload augmentation device onto the photographic payload device (step 212); and g) selectively inserting at least one respective weight plug of a plurality of weight plugs within at least one respective recess of the plurality of recesses of the photographic payload augmentation device until the photographic payload device and second lens are rebalanced on the stabilized support system (step 214). In a further aspect of the present invention, steps 208 through 214 of method 200 may be repeated for each additional lens intended to be mounted onto the photographic payload device. Additionally, step 210 may be completed any time prior to step 214.

Looking more specifically at each step in turn, in step 202, photographic payload device (camera 102) is equipped with a first lens 103a and is mounted onto camera mount 104 of the stabilized support system (gimbal 100). It is likely that gimbal 100 will be out of balance with the load of camera 102/first lens 103a added. As a result, gimbal 100 will freely rotate about each of the x-, y-, and z-axes (see FIGS. 1 and 2) until the center of gravity of the combined camera 102 and lens 103a is balanced on gimbal 100. As shown in FIG. 9 (top drawing), each of the camera 102 and lens 103a has its own respective center of gravity ($COG_C$ and $COG_{L1}$, respectively) which combine to define a center of gravity for the system ($COG_{S1}$) (shown generally with respect to the y-z plane). Typically, once camera 102 comes to rest, lens 103a will be pointed at an unwanted angle relative to gimbal 100 axes (e.g., not along the desired z-axis as shown in FIGS. 1 and 2; it should be noted that the desired angle of lens 103 may be selected by the photographer/videographer and does not necessarily need to be along the z-axis). In accordance with an aspect of the present invention, lens 103a is typically the longest and heaviest lens to be used, as this lens will generally have a $COG_{L1}$ which is farthest from $COG_C$ of the camera.

To correct the positioning of camera 102 and first lens 103a, gimbal 100 is balanced in step 204 using techniques generally known in the art. For instance, tilt adjuster 108, roll adjuster 112 and pan adjuster 116 are each manipulated until camera 102 is straight within gimbal 100 (i.e., points along z-axis). Once gimbal 100 has been balanced, at optional step 206, gimbal 100 may be locked to prevent any unwanted deviations from the balanced settings.

With gimbal 100 balanced, first lens 103a can be removed from camera 102 at step 208. Removal of first lens 103a shifts the center of gravity of the camera/lens system (now only camera 102) such that camera 102 will tilt backwards and sideways on gimbal 100. Without changing the position of camera 102 or adjusting the balance of gimbal 100, second lens 103b is mounted onto camera 102 at step 212. With reference to FIG. 9 (center drawing), second lens 103b has its own a center of gravity $COG_{L2}$, such that the camera/second lens system 102/103b has a center of gravity $COG_{S2}$. In a preferred embodiment, $COG_{L2}$ of second lens 103b is nearer to $COG_C$ of camera 102 such that their combined center of gravity $COG_{S2}$ is nearer $COG_C$ of camera 102 and displaced a distance delta ($\Delta$) from $COG_{S1}$ of camera/first lens system 102/103a. As a result, camera/second lens system 102/103b will continue to tilt backward and to the side relative to gimbal 100.

To correct for $\Delta$ and rebalance gimbal 100, photographic payload augmentation device (ring) 130 is mounted onto second lens 103b (step 210), with the combined ring/second lens 130/103b mounted to camera 102 (step 212). It should be noted that step 210 may be conducted before or after second lens 103b has been attached to camera 102. Ring 130 is secured around the body of lens 103b, such as via a friction fit as described above, and may be selectively positioned along the longitudinal axis L of lens 103b. In accordance with an aspect of the present invention, ring 130 is selectively positioned so as to avoid overlapping with the focus and zoom rings on lens 103b since the center of gravity of ring 130 may change when the focus and/or zoom rings are turned, as will be discussed in greater detail in the following paragraphs.

With ring 130 mounted onto lens 103b, which in turn is mounted onto camera 102, the center of gravity $COG_{S2D}$ of camera/second lens/ring 102/103b/130 may be adjusted by inserting respective weight plugs 154 into selected recesses 136 within ring 130 (step 214). Initially, weight plugs 154 are added until gimbal 100 no longer tilts backwards (i.e. lies parallel to x-y plane as shown in FIGS. 1 and 2). In accordance with an aspect of the present invention, weight plugs 154 are generally added to recesses 136 located along one side of ring 130 (e.g., if camera 102 tilts to the left with reference to FIGS. 1 and 2, weight plugs 154 are added to the right side of ring 130). If camera 102 begins to tilt forward (out of the page of FIGS. 1 and 2), too many weight plugs 154 have been added to ring 130. At least one weight plug 154 may be removed from ring 130 and/or the position of ring 130 on lens 103b may be shifted slightly along longitudinal axis L until camera 102 and gimbal 100 are balanced in the x-y plane. By way of example, as shown in FIG. 9 (bottom drawing), ring 130 and weight plugs 154 shift the center of gravity of second lens 103b such that their combined center of gravity, $COG_{L2D}$, equals the center of gravity of first lens 103a, $COG_{L1}$, and thereby corrects for $\Delta$ by shifting the center of gravity of the camera/second lens/ring 102/103b/130 system, $COG_{S2D}$, such that it is equal to the center of gravity of the reference system, $COG_{S1}$.

Once the correct number of weight plugs 154 have been added to ring 130 to correct camera 102/gimbal 100 balance in the x-y plane as described above, camera 102 is oriented such that second lens 103b points straight up, i.e., toward handle bar 114 along the y-axis. If the system is out of balance in the x-z plane, camera 102 will tilt either forward or backward (i.e., into or out of the page with reference to FIGS. 1 and 2). Without adding additional weight plugs 154, those weight plugs already inserted within ring 130 may relocated within alternative recesses 136 within ring 130. By way of example, if camera 102 tilts backward (into the page of FIGS. 1 and 2), weight plugs 154 from the top half of ring 130 are shifted to the bottom half of ring 130. In this manner, camera/second lens/ring system 102/103b/130 may be balanced in the x-z plane. Because no additional weight was added to the camera/second lens/ring system 102/103b/130, the system will remain balanced within the x-y plane. At this point, camera 102 and gimbal 100 will remain balanced when interchanging between first lens 103a and second lens/ring 103b/130.

As indicated by arrow 216, steps 208 through 214 may be repeated for each additional lens 103 which may be used with camera 102/gimbal 100. It should be further noted that once a set of lenses 103 has been so balance, this set may be used with any camera/gimbal without requiring balancing of each individual lens. That is, the new camera and/or gimbal system need only be balanced with regards to first lens 103a. Once first lens 103a has been balanced, each remaining lens 103b-103(n) (with its respective ring 130) will also already be in balance. Thus, a photographer/videographer need only balance a set of lenses once. As a result, lenses within a balanced set may be quickly and easily swapped during a shoot, thereby allowing the artist to truly capture his or her vision.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A photographic payload augmentation device comprising a ring having a ring body configured to mount onto a photographic payload device, wherein the ring body defines a plurality of recesses therein, and a plurality of weight plugs, wherein at least one respective weight plug of the plurality of weight plugs is selectively removably insertable within at least one respective recess of the plurality of recesses.

2. The photographic payload augmentation device in accordance with claim 1, wherein the ring body is cylindrically shaped.

3. The photographic payload augmentation device in accordance with claim 1, wherein the ring body includes an inner sidewall, outer sidewall, a top face and a bottom face, wherein each recess of the plurality of recesses is defined by a recess sidewall and terminates at a bottom wall located intermediate the top face and the bottom face.

4. The photographic payload augmentation device in accordance with claim 3, wherein the ring body further defines a plurality of apertures wherein a respective aperture is located between respective recess sidewalls of adjacent recesses of the plurality of recesses.

5. The photographic payload augmentation device in accordance with claim 3, wherein the bottom wall defines a plurality of slots wherein a respective slot communicates with a respective recess of the plurality of recesses.

6. The photographic payload augmentation device in accordance with claim 1, wherein the at least one respective weight plug is secured within the at least one respective recess via a friction fit.

7. The photographic payload augmentation device in accordance with claim 1, wherein the at least one respective weight plug sits flush with or below the top face of the ring body when inserted within the at least one respective recess.

8. The photographic payload augmentation device in accordance with claim 1, wherein the ring body is fabricated from natural rubber or a synthetic elastomer.

9. The photographic payload augmentation device in accordance with claim 8, wherein the synthetic elastomer comprises one or more of silicone, polybutadiene, polychloropene, polyisobutylene and poly(styrene-butadiene-styrene) rubber.

10. The photographic payload augmentation device in accordance with claim 1, wherein each weight plug comprises a metal, a polymeric material and a composite.

11. The photographic payload augmentation device in accordance with claim 1, wherein each weight plug comprises lead, steel, aluminum or tungsten and their alloys; a thermoplastic; and composites comprising any combination of the above.

12. The photographic payload augmentation device in accordance with claim 1, and further including an external weight adaptor comprising a plug portion dimensioned to be received within a selected recess, a flange having a first end and a second end wherein the first end of the flange is releasably coupled to the plug portion, and wherein the second end of the flange is fixedly coupled to a weight mount, wherein one or more weight units are releasably mounted on the weight mount.

13. A method for enabling swapping of lenses on a photographic payload device mounted on a stabilized support system, the method comprising:
  a) mounting a photographic payload device having a first lens on the stabilized support system;
  b) adjusting the stabilized support system to balance the photographic payload device and first lens;
  c) locking the stabilized support system balance;
  d) removing the first lens from the photographic payload device;
  e) mounting a photographic payload augmentation device onto a second lens, wherein the photographic payload augmentation device comprises a ring defining a ring body having a plurality of recesses therein;
  f) mounting the second lens with photographic payload augmentation device onto the photographic payload device;
  g) selectively inserting at least one respective weight plug of a plurality of weight plugs within at least one respective recess of the plurality of recesses of the photographic payload augmentation device until the photographic payload device and second lens are rebalanced on the stabilized support system.

14. The method in accordance with claim 13 wherein the method further comprises:
  h) repeating steps d) through g) for each additional lens mounted onto the photographic payload device.

15. The method in accordance with claim 13 wherein step e) may be completed any time prior to step g).

* * * * *